United States Patent
Nakano et al.

(10) Patent No.: US 8,752,686 B2
(45) Date of Patent: Jun. 17, 2014

(54) MULTI-DISC FRICTIONAL ENGAGEMENT MECHANISM

(75) Inventors: Yusuke Nakano, Yamato (JP); Katsuya Kobayashi, Yokohama (JP)

(73) Assignee: Jatco Ltd, Fuji-shi (JP)

( * ) Notice: Subject to any disclaimer, the term of this patent is extended or adjusted under 35 U.S.C. 154(b) by 141 days.

(21) Appl. No.: 13/403,367

(22) Filed: Feb. 23, 2012

(65) Prior Publication Data
US 2012/0247913 A1    Oct. 4, 2012

(30) Foreign Application Priority Data

Mar. 29, 2011 (JP) ................................. 2011-071392

(51) Int. Cl.
*F16D 25/061* (2006.01)
*F16D 25/0638* (2006.01)
*F15B 15/20* (2006.01)

(52) U.S. Cl.
USPC ............ 192/53.4; 192/52.4; 192/114 R; 192/85.18; 192/85.38

(58) Field of Classification Search
CPC ............... F16D 25/061; F15B 15/20
See application file for complete search history.

(56) References Cited

U.S. PATENT DOCUMENTS

| | | | |
|---|---|---|---|
| 3,063,529 A * | 11/1962 | Cook | 192/53.5 |
| 4,064,979 A | 12/1977 | Crankshaw | |
| 4,083,436 A * | 4/1978 | Straut | 188/265 |
| 7,036,644 B2 * | 5/2006 | Stevenson et al. | 192/35 |
| 8,172,058 B2 * | 5/2012 | Grochowski et al. | 192/85.24 |
| 2010/0179026 A1 | 7/2010 | Grochowski et al. | |

FOREIGN PATENT DOCUMENTS

| | | |
|---|---|---|
| JP | 07-012221 A | 1/1995 |
| JP | 2008-075665 A | 4/2008 |
| WO | WO 99/24731 A1 | 5/1999 |

* cited by examiner

*Primary Examiner* — David D Le
*Assistant Examiner* — Mark Manley
(74) *Attorney, Agent, or Firm* — Foley & Lardner LLP

(57) ABSTRACT

A multi-disc frictional engagement mechanism includes driven plates and drive plates, a clutch piston including a radially extending first pressure receiving portion, a joint piston including a radially extending second pressure receiving portion and an engaging portion which is engaged with a clutch hub to engage the clutch hub and the clutch drum such that the clutch hub and the clutch drum are not relatively rotatable when the joint piston advances, a first oil chamber which causes a hydraulic pressure to act on the first pressure receiving portion, and a second oil chamber which communicates with the first oil chamber and to which the hydraulic pressure is supplied later than to the first oil chamber to act on the second pressure receiving portion when the hydraulic pressure is supplied to the first oil chamber.

5 Claims, 8 Drawing Sheets

MULTI-DISC FRICTIONAL ENGAGEMENT MECHANISM

FIELD OF THE INVENTION

The present invention relates to a multi-disc frictional engagement mechanism used in a clutch/brake of an automatic transmission.

BACKGROUND OF THE INVENTION

In a clutch/brake of an automatic transmission, a multi-disc frictional engagement mechanism is used to couple two members (both are rotational elements in the case of the clutch, one is a rotational element and the other is a non-rotational element in the case of the brake) which are coaxially arranged.

In the multi-disc frictional engagement mechanism, a plurality of friction plates are mounted slidably in an axial direction on the respective two members and the friction plates of the two members are alternately arranged. When the friction plates of the two members are pressed against each other by a hydraulic piston, the two members are coupled via the friction plates.

SUMMARY OF THE INVENTION

In the multi-disc frictional engagement mechanism having the above construction, it is necessary to drive an oil pump and constantly supply a hydraulic pressure to an oil chamber for displacing the hydraulic piston to maintain a coupled state, which has caused a problem of worsening fuel economy of a vehicle including an automatic transmission.

Further, in the case of constantly supplying the hydraulic pressure, a seal ring for producing a pressing force to a facing member by being deformed in axial and radial directions in response to the hydraulic pressure is constantly pressing the facing member, whereby fuel economy is worsened also by a sliding friction force of the seal ring.

JP7-12221A discloses an improvement in fuel economy of a vehicle by ensuring a clearance between friction plates utilizing a biasing force of a spring in an uncoupled state and, thereby, reducing friction between the friction plates in the uncoupled state. However, to maintain the coupled state, it remains to be necessary to constantly supply a hydraulic pressure to an oil chamber by driving an oil pump.

The present invention aims to improve fuel economy of a vehicle including an automatic transmission by reducing a hydraulic pressure supplied to an oil chamber for displacing a hydraulic piston in a coupled state.

According to an aspect of the present invention, a multi-disc frictional engagement mechanism for coupling a first member and a second member which are coaxially arranged, is provided. The multi-disc frictional engagement mechanism includes a plurality of first friction plates mounted on the first member slidably in an axial direction; a plurality of second friction plates mounted on the second member slidably in the axial direction, the plurality of first friction plates and the plurality of second friction plates being alternately arranged; a clutch piston arranged displaceably in a direction perpendicular to the first and second friction plates and including a radially extending first pressure receiving portion; a joint piston including a radially extending second pressure receiving portion provided so as not to be relatively rotatable, but to be displaceable in the axial direction relative to the second member and an engaging portion which is engaged with the first member to engage the first and second members such that the first and second members are not relatively rotatable when the joint piston advances: a first oil chamber which causes a hydraulic pressure to act on the first pressure receiving portion; and a second oil chamber which communicates with the first oil chamber and to which the hydraulic pressure is supplied later than to the first oil chamber to act on the second pressure receiving portion when the hydraulic pressure is supplied to the first oil chamber.

According to the above aspect, since the hydraulic pressure needs not be supplied to the first oil chamber in the coupled state, the hydraulic pressure supplied to the first oil chamber can be reduced. Further, since deformation of the seal ring is suppressed to reduce a pressing force and reduce a sliding friction force by reducing the hydraulic pressure supplied to the first oil chamber, fuel economy of a vehicle including an automatic transmission can be improved.

Embodiments and advantages of this invention will be described in detail below with reference to the attached figures.

DESCRIPTION OF THE PREFERRED EMBODIMENTS

Figure 1:
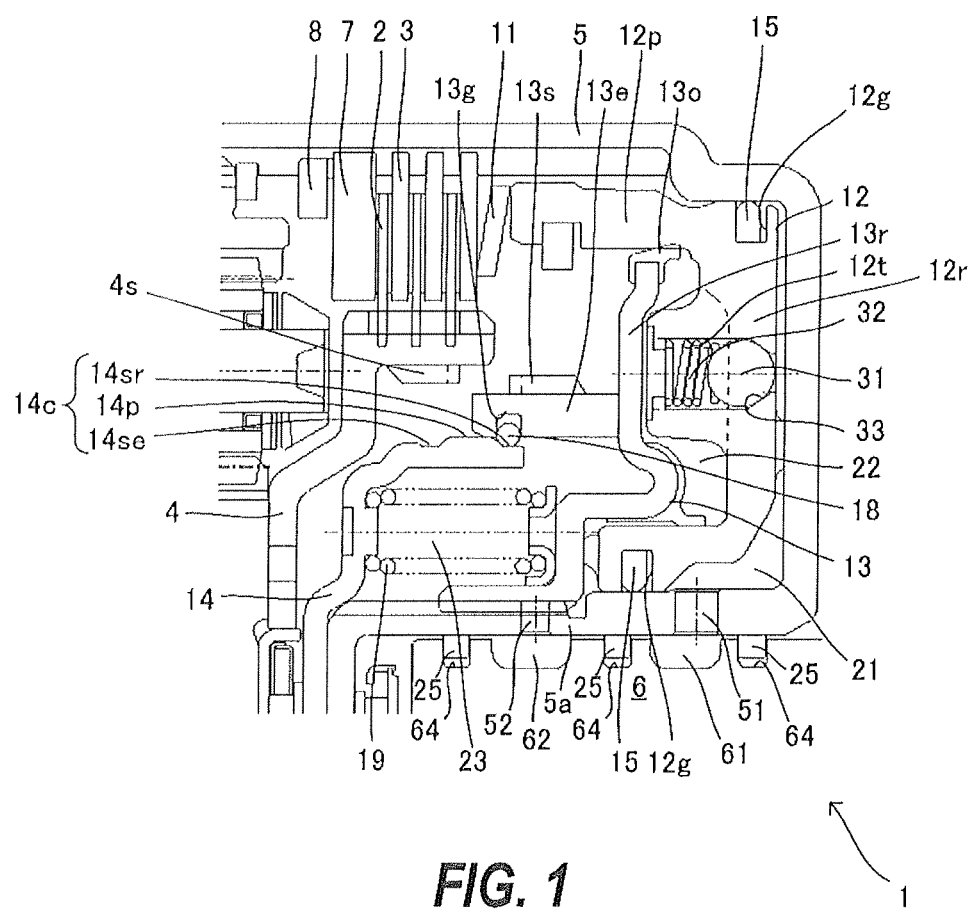
FIG. 1 is a sectional view of a multi-disc frictional engagement mechanism according to an embodiment of the present invention.

FIG. 1 is a sectional view of a multi-disc clutch 1 according to an embodiment of the present invention. The multi-disc clutch 1 is a frictional engagement mechanism which is arranged in a transmission case of an automatic transmission and integrally rotatably couples a clutch hub 4 and a clutch drum 5, which are coaxially arranged, by coupling driven plates 2 and drive plates 3.

The clutch hub 4 is a tubular member with an open right side in FIG. 1 and coupled to an unillustrated rotational element (shaft, gear or the like).

The clutch drum 5 is a tubular member having an open left side in FIG. 1 and including a folded portion 5a inside. The clutch drum 5 is rotatably supported at the folded portion 5a via seal rings 25 provided on a drum support 6 fixed in the transmission. The clutch drum 5 is coupled to another unillustrated rotational element (shaft, gear or the like) and transmits rotation input from this other rotational element to the clutch hub 4 via the driven plates 2 and the drive plates 3.

Splines extending in an axial direction are formed on the outer periphery of the clutch hub 4, and a plurality of driven plates 2 are fitted slidably in the axial direction in the splines. Similarly, splines extending in the axial direction are also formed on the inner periphery of the clutch drum 5, and a plurality of drive plates 3 are fitted slidably in the axial direction in the splines.

The driven plates 2 are metal discs and friction materials are bonded to both surfaces thereof. The drive plates 3 are metal discs. The driven plates 2 and the drive plates 3 are alternately arranged, i.e. arranged in a nested manner.

A retaining plate 7 is further fitted in the splines of the clutch drum 5. A displacement of the retaining plate 7 to the left of FIG. 1 is restricted by a snap ring 8.

Further, splines 4s extending in the axial direction are formed on the inner periphery of the clutch hub 4, and splines 13s formed in an engaging portion 13e of a joint piston 13 to be described later are engaged therewith when the clutch hub 4 and the clutch drum 5 are coupled (this is described later).

A tension plate 11, a clutch piston 12, the joint piston 13 and a seat plate 14 are housed in the clutch drum 5. A first oil chamber 21, a second oil chamber 22 and a third oil chamber 23 are respectively defined between the clutch drum 5 and the clutch piston 12, between the clutch piston 12 and the joint piston 13 and between the joint piston 13 and the seat plate 14.

The tension plate 11 is inter posed between the clutch piston 12 and the driven plates 2, the drive plates 3 and keeps a distance therebetween constant when the multi-disc clutch 1 is in a released state.

The clutch piston 12 includes a piston portion 12p and a first pressure receiving portion 12r extending in a radial direction from the piston portion 12p. Recessed grooves 12g are formed in the outer and inner peripheries of the first pressure receiving portion 12r and D-rings 15 are housed in the recessed grooves 12g.

The first pressure receiving portion 12r is formed with a communication hole 12t allowing the first and second oil chambers 21, 22 to communicate, and a ball 31 and a spring 32 are housed in the communication hole 12t. A side of the communication hole 12t near the first oil chamber 21 is narrowed to for in a seat surface 33, and the ball 31 biased by the spring 32 is seated on the seat surface 33. The ball 31, the spring 32 and the seat surface 33 function as a check valve. When a hydraulic pressure of the first oil chamber 21 exceeds a valve opening pressure determined by a biasing force of the spring 32, the ball 31 is separated from the seat surface 33 and the supply of the hydraulic pressure from the first oil chamber 21 to the second oil chamber 22 is allowed via the communication hole 12t.

The clutch hub 4 and the clutch drum 5 are synchronously rotated by displacing the clutch piston 12 in a direction perpendicular to the driven plates 2 and the drive plates 3 to compress the tension plate 11 and further bringing the driven plates 2 and the drive plates 3 into sliding contact.

The joint piston 13 includes a second pressure receiving portion 13r and the engaging portion 13e. An inner peripheral side of the joint piston 13 is spline-engaged with the clutch drum 5 and displaceable in the axial direction, but not rotatable relative to the clutch drum 5. Further, an oil seal 13o is mounted on an outer peripheral side and the joint piston 13 slides in contact with the piston portion 12p of the clutch piston 12 via the oil seal 13o.

The engaging portion 13e extends in the axial direction from the second pressure receiving portion 13r. The splines 13s extending in the axis direction are formed on the outer periphery of an end part of the engaging portion 13e, and a recessed groove 13g extending in a circumferential direction is formed in the inner periphery of the end part. A snap ring 18 covered by a seal member and having a smaller inner diameter than the inner periphery of the engaging portion 13e is housed in the recessed groove 13g.

The clutch hub 4 and the clutch drum 5 are engaged in a rotating direction by engaging the splines 13s of the engaging portion 13e with the splines 4s on the inner periphery of the clutch hub 4 with the rotation of the clutch hub 4 and that of the clutch drum 5 synchronized or substantially synchronized.

Figure 2:
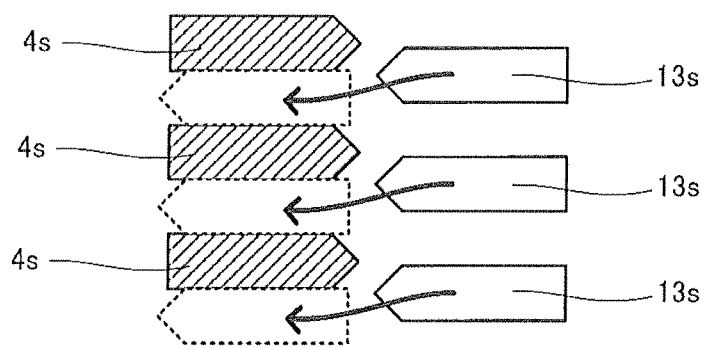
FIG. 2 is a view of a spline engaging part when viewed in a radial direction.

FIG. 2 is a view of the splines 4s of the clutch hub 4 and the splines 13s of the engaging portion 13e when viewed in a radial direction. The splines 4s, 13s have tapered surfaces at facing sides. When the splines 4s, 13s are brought closer to each other, the tapered surfaces come into contact with each other and the clutch hub 4 and the clutch drum 5 are automatically positioned in a rotating direction (vertical direction in FIG. 2) so that the splines 4s, 13s are engaged.

Referring back to FIG. 1, the seat plate 14 is a tubular member with an open right side in FIG. 1 and integrally provided to the clutch drum 5. A return spring 19 is interposed between the seat plate 14 and the joint piston 13. Further, a cam surface 14c including a raised portion 14p having an outer diameter larger than the inner diameter of the snap ring 18 and a releasing-side holding portion 14sr and a coupling-side holding portion 14se formed at the opposite sides of the raised portion 14p and having an outer diameter equal to the inner diameter of the snap ring 18 is formed on the outer periphery of the seat plate 14.

Note that, in the following description, movements of the clutch piston 12 and the joint piston 13 toward the driven plates 2 and the drive plates 3 are expressed by "to advance" and movements thereof away from the driven plates 2 and the drive plates 3 are expressed by "to retract". Further, a direction toward the driven plates 2 and the drive plates 3 is expressed by a "coupling direction" and a direction away therefrom is expressed by a "releasing direction".

A first oil path 51 and a second oil path 52 allowing the inner and outer sides of the clutch drum 5 to communicate are respectively formed in the folded portion 5a of the clutch drum 5. An apply pressure can be supplied to the first oil chamber 21 from an oil path 61 formed in the drum support 6 via the first oil path 51. A release pressure can be supplied to the third oil chamber 23 from an oil path 62 formed in the drum support 6 via the second oil path 52. The apply pressure and the release pressure are prepared by an unillustrated hydraulic control circuit using a discharge pressure of an unillustrated oil pump as a source pressure.

Recessed grooves 64 are respectively formed at the opposite sides of the oil paths 51, 52, and the seal rings 25 are respectively housed in the recessed grooves 64. The seal rings 25 are deformed in the axial and radial directions and pressed against the drum support 6 in response to hydraulic pressures of the oil paths 51, 52, 61 and 62, thereby sealing between the clutch drum 5 and the drum support 6.

Next, coupling and releasing operations of the above multi-disc clutch 1 are described.

FIGS. 3A to 3E show movements when the multi-disc clutch 1 changes from the released state to the coupled state.

Figure 3A:
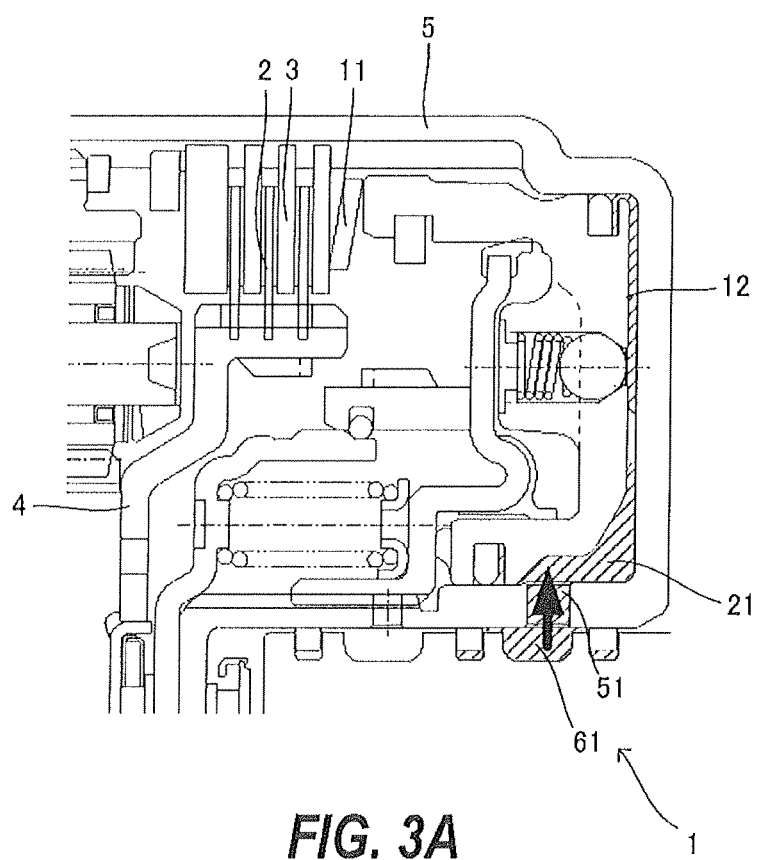
FIGS. 3A to 3E are views showing a coupling operation of the multi-disc frictional engagement mechanism.

To couple the multi-disc clutch 1, the apply pressure is first supplied to the first oil chamber 21 via the oil paths 51, 61 (FIG. 3A).

Figure 3B:
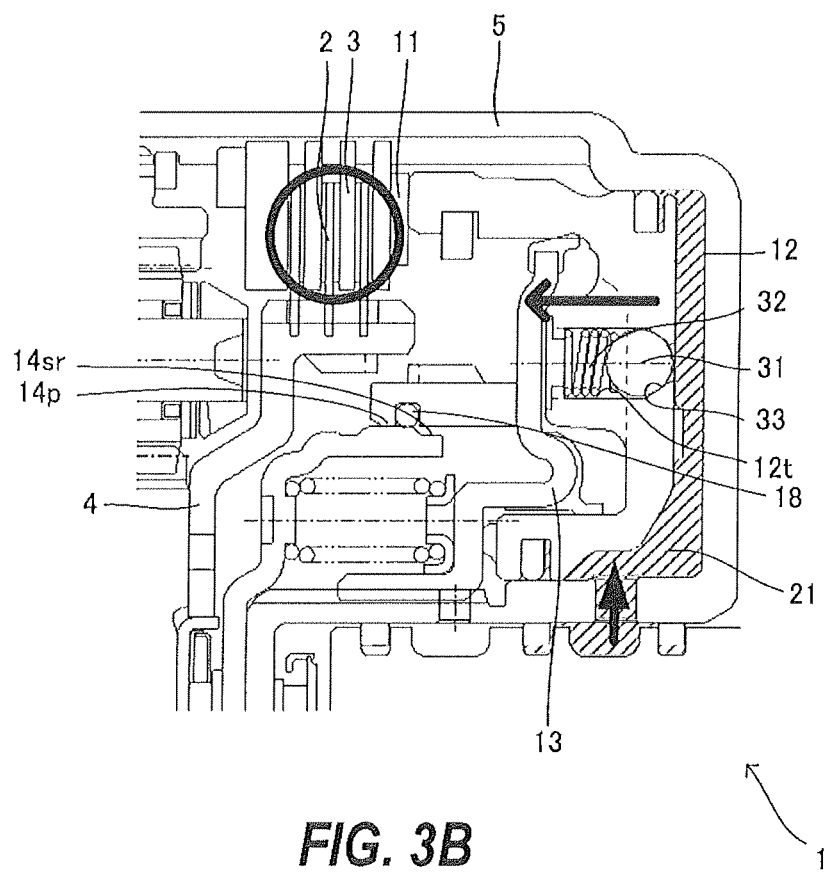

Then, the clutch piston 12 advances, the tension plate 11 is compressed and the driven plates 2 and the drive plates 3 are pressed against each other to be coupled (FIG. 3B). By this, the rotation of the clutch hub 4 and that of the clutch drum 5 are synchronized.

Further, the joint piston 13 advances together with the clutch piston 12 and the snap ring 18 exits from the releasing-side holding portion 14sr and moves onto the raised portion 14p, whereby the joint piston 13 can freely advance.

Figure 3C:
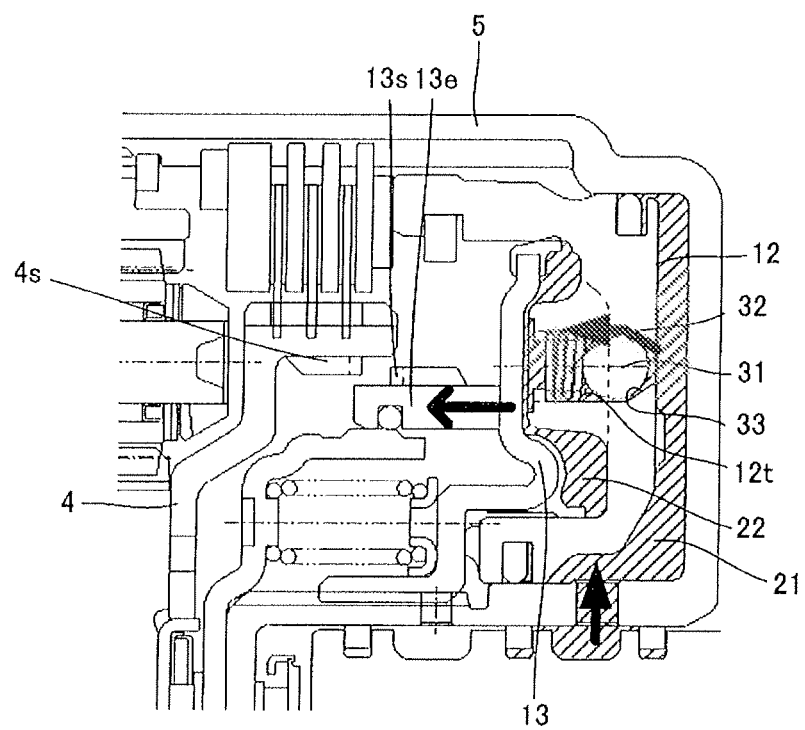

When clearances between the driven plates 2 and the drive plates 3 become zero to stop the clutch piston 12, the hydraulic pressure of the first oil chamber 21 increases and the ball 31 is separated from the seal surface 33 against the biasing force of the spring 32 (FIG. 3C). By this, the first and second oil chambers 21, 22 communicate via the communication hole 12t and the hydraulic pressure is supplied from the first oil chamber 21 to the second oil chamber 22.

As described above, since the joint piston 13 can freely advance in this state, it advances in response to the supply of the hydraulic pressure to the second oil chamber 22.

Figure 3D:
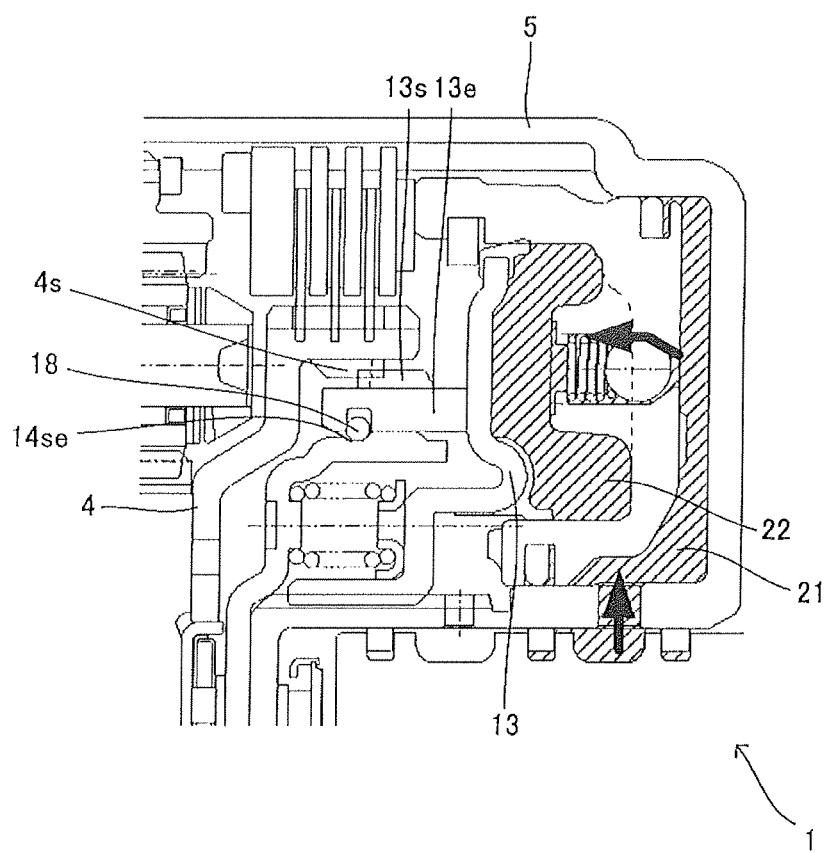
Figure 3E:
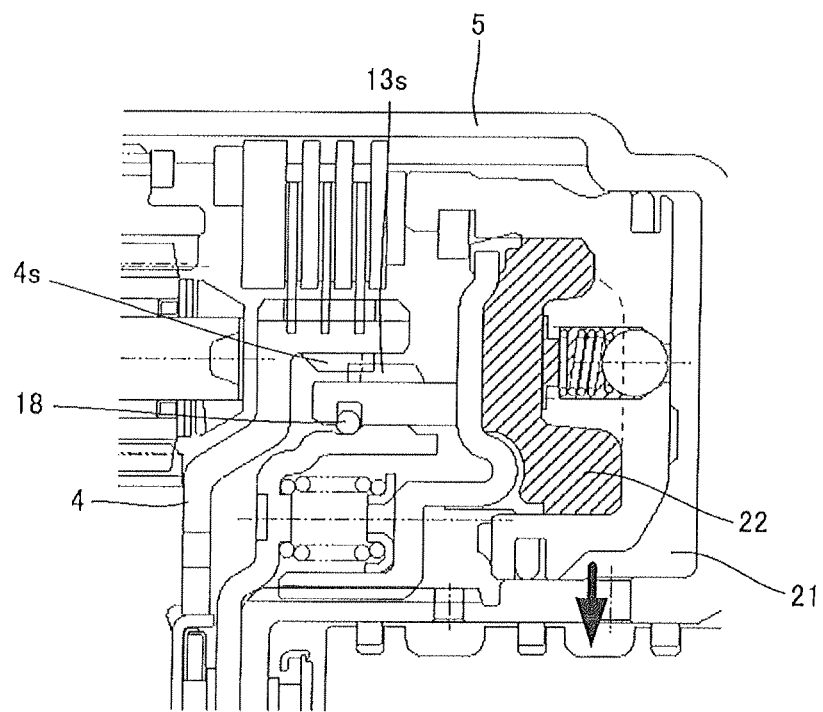

Since the clutch hub 4 and the clutch drum 5 are synchronously rotated, the splines 13s of the engaging portion 13e and the splines 4s of the clutch hub 4 are engaged after being automatically positioned in the rotating direction when the splines 13s of the engaging portion 13e approach the splines 4s of the clutch hub 4, whereby the clutch hub 4 and the clutch drum 5 are so engaged as not to be relatively rotatable in the rotating direction (FIG. 3D).

Further, the snap ring 18 is fitted into the coupling-side holding portion 14se, thereby restricting a retracting movement of the joint piston 13.

Thereafter, the supply of the apply pressure is stopped (FIG. 3E) and the hydraulic pressure of the first oil chamber 21 finally becomes zero. However, since the splines 4s, 13s are engaged and the position of the joint piston 13 in the releasing direction is restricted by the snap ring 18, the coupled state of the clutch hub 4 and the clutch drum 5 is maintained. That is, the supply of the hydraulic pressure to the first oil chamber 21 is temporary.

Figure 4:
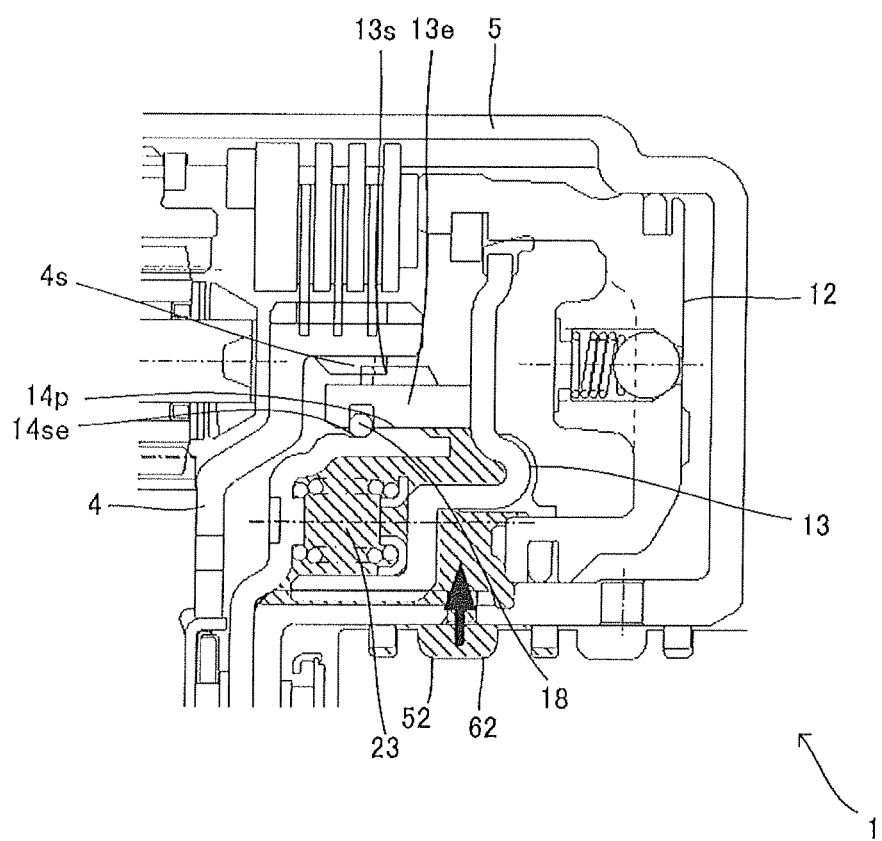
FIG. 4 is a view showing a releasing operation of the multi-disc frictional engagement mechanism.

FIG. 4 is a view showing a movement when the multi-disc clutch 1 changes from the coupled state to the released state.

To release the multi-disc clutch 1, the release pressure is supplied from the oil paths 52, 62 to the third oil chamber 23 (FIG. 4). Then, the snap ring 18 exits from the coupling-side holding portion 14se and moves onto the raised portion 14p, whereby the joint piston 13 can freely retract.

Then, the joint piston 13 retracts to disengage the splines 13s of the engaging portion 13e and the splines 4s of the clutch hub 4. Subsequently, the clutch piston 12 retracts to release the coupled state of the driven plates 2 and the drive plates 3.

Thereafter, the supply of the release pressure is stopped and the hydraulic pressure of the third oil chamber 23 finally becomes zero. However, the released state of the clutch hub 4 and the clutch drum 5 is maintained. That is, the supply of the hydraulic pressure to the third oil chamber 23 is temporary.

Next, functions and effects of this embodiment are described.

According to this embodiment, the hydraulic pressure needs not be supplied to the first oil chamber 21 in the coupled state, and fuel economy of a vehicle including the automatic transmission can be improved by reducing the hydraulic pressure supplied to the first oil chamber 21.

Further, when the hydraulic pressure supplied to the oil chamber 21 is reduced, the deformation of the seal rings 25 is suppressed to reduce a pressing force and reduce a sliding friction force between the seal rings 25 and the drum support 6. Thus, fuel economy can also be improved by this.

Note that, according to this embodiment, it is also not necessary to supply the hydraulic pressure to the third oil chamber 23 in the released state.

Although the embodiment of the present invention has been described above, the above embodiment is merely illustration of one application example of the present invention and not of the nature to limit the technical scope of the present invention to the specific construction of the above embodiment.

For example, the present invention is applied to the multi-disc clutch 1 in the above embodiment, but may also be applied to a brake in which one of elements to be coupled is a rotational element and the other element is a non-rotational element.

Further, although the supply of the hydraulic pressure is stopped to zero the hydraulic pressures of the first and third oil chambers 21, 23 in the coupled and released states in the above embodiment, the hydraulic pressure may only be reduced (hydraulic pressure after a reduction is equal to or more than zero).

This application claims priority based on Japanese Patent Application No. 2011-71392, filed with the Japan Patent Office on Mar. 29, 2011, the entire content of which is incorporated into this specification by reference.

What is claimed is:

1. A multi-disc frictional engagement mechanism for coupling a first member and a second member which are coaxially arranged, comprising:
   a plurality of first friction plates mounted on the first member slidably in an axial direction;
   a plurality of second friction plates mounted on the second member slidably in an axial direction, the plurality of first friction plates and the plurality of second friction plates being alternately arranged;
   a clutch piston arranged displaceably in a direction perpendicular to the pluralities of the first and second friction plates and including a radially extending first pressure receiving portion;
   a joint piston including a radially extending second pressure receiving portion provided so as to be displaceable in the axial direction relative to the second member without being relatively rotatable, and an engaging portion which is configured to engage with the first member and to engage with the second member such that the first and second members are not relatively rotatable when the joint piston advances;
   a first oil chamber which is configured to cause a hydraulic pressure to act on the first pressure receiving portion;
   a second oil chamber configured to communicate with the first oil chamber and to which the hydraulic pressure is supplied later than to the first oil chamber so as to act on the second pressure receiving portion when the hydraulic pressure is supplied to the first oil chamber, and
   a restricting mechanism configured to restrict a retracting movement of the joint piston by a mechanical contact in a state in which the engaging portion is engaged with the first member and a supply of the hydraulic pressure to the first oil chamber is stopped.

2. The multi-disc frictional engagement mechanism according to claim 1, wherein the engaging portion is a spline and engaged with another spline formed in the first member, and
   wherein the first and second members are engaged without being relatively rotatable.

3. The multi-disc frictional engagement mechanism according to claim 1, wherein the second oil chamber is defined between the first and second pressure receiving portions;
   wherein the first and second oil chambers are configured to communicate via a communication hole formed in the first pressure receiving portion; and
   wherein a valve configured to open when the hydraulic pressure of the first oil chamber increases to a valve opening pressure is provided in the communication hole.

4. The multi-disc friction engagement mechanism according to claim 1, wherein the restricting mechanism includes:
   a holding portion provided on a side of the second member, and
   a snap ring that is provided on the joint piston and is configured to fit into the holding portion when the restricting mechanism restricts the retracting movement of the joint piston.

5. The multi-disc friction engagement mechanism according to claim 1, further comprising a third oil chamber provided at a side opposite to the second oil chamber with respect to the second pressure receiving portion,
wherein the restricting mechanism is further configured to release a restriction of the retracting movement of the joint piston when the hydraulic pressure is supplied to the third oil chamber.

\* \* \* \* \*